Patented May 2, 1933

1,906,940

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Original application filed December 4, 1929, Serial No. 411,666. Divided and this application filed July 28, 1931. Serial No. 553,644.

This invention relates to the treatment of rubber and similar materials, more particularly to a treatment of the same with certain derivatives of reaction products of ketones and salts of aromatic amino compounds, and of rearranged reaction products of ketones and amino compounds. It also relates to the products of such treatment.

An object of this invention is to provide materials having the property of retarding the deterioration of rubber. Another object is to provide materials having the property of improving the resistance of rubber to abrasion; another object is to provide materials which prevent or retard cracking of tread stocks containing carbon black. A still further object is to provide materials having vulcanization-accelerating properties. Other objects will be apparent from the hereinset-forth description.

Accordingly the invention comprises treating rubber or similar materials with an aldehyde derivative of the reaction product of a ketone and a salt of an aromatic amino compound, or of a rearranged reaction product of a ketone and an aromatic amino compound. Such materials are stable, and will when used in rubber exhibit at least one of the above mentioned properties.

Examples of reaction products of ketones and salts of aromatic amino compounds—acetone-aniline-hydrochloride, mesityl oxide-aniline-hydrochloride, diacetone alcohol-aniline - hydrochloride, acetone - diphenyl guanidine hydrochloride, acetone-p,p'-diamino-diphenyl methane hydrochloride, acetone-di-o-tolyl guanidine hydrochloride, acetone-o-tolyl biguanide hydrochloride, acetone-di-phenylamine hydrochloride, acetone-phenyl-beta-naphthylamine hydrochloride, acetone-aniline acetate, acetone-o-toluidine hydrochloride, acetone - o,o' - diamino - diphenyl sulfide hydrochloride.

Examples of rearranged reaction products of ketones—acetone-aniline rearranged in the presence of aniline hydrochloride, acetone-diphenyl guanidine rearranged in the presence of aniline hydrochloride, acetone-alpha-naphthyl amine rearranged in the presence of aniline hydrochloride.

Examples of aldehyde derivatives—reaction product of formaldehyde and the reaction product of acetone and aniline hydrochloride, reaction product of formaldehyde and the reaction product of diacetone alcohol and aniline hydrochloride, reaction product of formaldehyde and the reaction product of acetone and o-tolyl biguanide hydrochloride, reaction product of formaldehyde and the reaction product of acetone and diphenyl guanidine hydrochloride.

Instead of the ketones mentioned above the following may be used: phorone, diethyl ketone, benzo phenone, aceto-phenone, dichloracetone, aldol acetone, allyl-acetone, benzal acetone, diacetyl, acetyl-acetone, acetonyl-acetone, salicyl aldehyde-acetone, furfural-acetone.

Instead of the aromatic amino compounds mentioned above there may be used: monochloro aniline, ortho-toluidine, meta toluidine, para-toluidine, xylidines, alpha-naphthylamine, beta naphthylamine, amino diphenyl, dinaphthylamines, asymmetric diphenyl hydrazine, diamino diphenyl sulphide, diamino diphenyl polysulphides, diamino dinaphthyl sulfides, p-amino benzyl-aniline, dinaphthyl diamino ethane, ditolyl diamino ethane, p-amino-p'naphthylamino diphenyl methane, p-p'-diamino diphenyl dimethyl methane, p-p'dinaphthyl amino diphenyl dimethyl methane, phenyl beta naphthyl guanidine, phenyl-o-tolyl guanidine, di-o-tolyl biguanide, monophenyl biguanide, diphenyl biguanide, diphenyl acetamidine, o-phenylene diamine, m-phenylene diamine, p-phenylene diamine, dimethyl p-phenylene diamine, m-toluylene diamine, benzidine, naphthylene diamine; 2,2'-diamino diphenyl; 2,4'-diamino diphenyl; diphenyl-p-phenylene diamine, ditolyl-p-phenylene diamine, dinaphthyl-p-phenylene diamine, diphenyl-benzidine, dinaphthyl-benzidine, naphthyl-m-toluylene diamine, dinaphthyl-m-toluylene diamine; 2,4-diamino-diphenylamine; 4,4'-diamino diphenylamine; or mixtures of any of the foregoing aromatic amino compounds with a phenol such as phenol, alpha-naphthol, beta-naphthol.

In the reactions of ketones with salts of aromatic amino compounds, such aromatic amino compounds as contain at least one ortho or para carbon atom linked to hydrogen, have been found to be most suitable.

The reaction may be carried out with or without the aid of a dehydrating agent. The following chemicals or mixtures thereof may be used as dehydrating agents: Calcium chloride, iodine, sulphanilic acid, hydrochloric acid, sulphuric acid, phosphorus pentoxide, sodium hydroxide, magnesium perchlorate, acetic acid, barium oxide, zinc chloride, etc. It is an advantage to use the amine-addition product with zinc chloride, for example $(C_6H_5NH_2)$, $ZnCl_2$, as a dehydrating agent.

*Example 1*—Reaction product of ketones and salts of amino compounds—By heating one mole of aniline hydrochloride and approximately four moles of acetone in an autoclave at 170° C. during 72 hours a reaction occurs during which methane is produced as a by-product. After cooling the reaction mixture, the methane is allowed to escape and the reaction product is freed from unreacted acetone. By neutralization with caustic soda and separation of the product a material is obtained which is a powerful antioxidant. The material is semi-solid and turns solid on standing. The results of tests in a tire tread compound are as follows:

| Green tensiles | Blank | +reaction product |
|---|---|---|
| (Cure) 60' at 45#  | 4175 | 4092 |
| (Cure) 75' at 45#  | 4245 | 3940 |
| (Cure) 90' at 45#  | 4285 | 4055 |
| Aged 168 hrs. in oxygen | | |
| (Cure) 60' at 45#  | 1510 | 3190 |
| (Cure) 75' at 45#  | 1310 | 3030 |
| (Cure) 90' at 45#  | 1250 | 2900 |

The structure of these reaction products is not definitely known.

Aniline-acetate may be used in place of aniline-hydrochloride in the reaction. In this case tire tread compounds tested for resistance to abrasion gave the following values:

| 60' cure | Relative wear |
|---|---|
| Blank | 154 |
| + .75 parts of reaction product | 181 |

*Example 2*—Diphenylguanidine-hydrochloride was found to react readily with acetone. A temperature of 120° C. and a reaction time of 20 hours are required to obtain a practically complete reaction. In this case, again, methane is produced. The acetone-diphenylguanidine-hydrochloride reaction product is prepared as follows:

211 grams diphenylguanidine (1 mole) are added to 110 grams 36% aqueous hydrochloric acid. The solution of diphenylguanidine hydrochloride is filtered through glass wool and can be used as such, without removal of water. 400 grams of acetone are added and the mixture is heated in an autoclave at 120° C. during 20 hours. After cooling, the methane formed is blown off, excess acetone is recovered and the hydrochloric acid is neutralized with 10% sodium hydroxide solution. The resulting product is an oil which floats on top of the water layer. After separation from the water it can be used without further purification.

1.5 parts of the reaction product of acetone and diphenylguanidine hydrochloride per 100 parts of rubber are incorporated in the usual manner in a tire tread compound. The resulting stocks are aged in the oxygen bomb for 168 hours. A similar stock is made from which the antioxidant is omitted. The mix is vulcanized and aged under the same conditions. The tensile strengths before and after ageing are shown below.

| Cure | Tensiles | |
|---|---|---|
| Before ageing | Blank | +reaction product |
| 50' at 45# | 4075 | 4225 |
| 60' at 45# | 4065 | 3985 |
| 75' at 45# | 4020 | 3885 |
| 90' at 45# | 4010 | 4160 |
| After ageing | | |
| 50' at 45# | 1375 | 2685 |
| 60' at 45# | 1285 | 2820 |
| 75' at 45# | 1205 | 2495 |
| 90' at 45# | 1215 | 2520 |

*Example 3*—Reaction product of acetone and phenyl beta naphthylamine hydrochloride.

74 grams of phenyl beta-naphthylamine are added to 40 grams of concentrated aqueous hydrochloric acid. The hydrochloride thus obtained is dried at 120° C. and yields 81.5 grams of phenyl beta-naphthylamine hydrochloride. 300 grams of acetone are added and the mixture is heated in an autoclave at 170–190° C. for 30 hrs. After cooling, the methane formed is blown off, excess acetone is recovered and the hydrochloric acid is neutralized with 10% caustic soda solution. After separation from the water and drying, the reaction product is a brown powder; yield, about 111 grams.

1.5 parts of the reaction product of acetone and phenyl beta-naphthylamine hydrochloride per 100 parts of rubber are incorporated in the usual manner in a tire tread compound. The resulting stock is aged in an oxygen bomb. A similar stock is made from which the reaction product is omitted. This mix is vulcanized and aged under the same conditions. The tensile strengths before and after ageing are shown below.

| Cure | Tensiles | |
|---|---|---|
| Before ageing | Blank | +reaction product |
| 45' at 45#  | 3075 | 3355 |
| 60' at 45#  | 3630 | 4010 |
| 75' at 45#  | 4165 | 3845 |
| 90' at 45#  | 3725 | 3740 |
| After ageing 168 hrs. in oxygen bomb | | |
| 45' at 45#  | 1080 | 2450 |
| 60' at 45#  | 895 | 2585 |
| 75' at 45#  | 785 | 2045 |
| 90' at 45#  | 748 | 2800 |
| After ageing 3 week at 158° F. | | |
| 45' at 45#  | 1935 | 2953 |
| 60' at 45#  | 1753 | 3117 |
| 75' at 45#  | 1397 | 2950 |
| 90' at 45#  | 1440 | 3027 |

*Example 4*—The reaction product of acetone and the hydrochloride of o-tolyl biguanide is made in a way similar to the preparation of the reaction product of acetone and diphenyl guanidine hydrochloride. The material was tested in the usual manner with the following results:

| Tensiles before ageing | Blank | +reaction product |
|---|---|---|
| 60' at 45#  | 4390 | 4325 |
| 75' at 45#  | 4275 | 4555 |
| 90' at 45#  | 4375 | 4205 |
| After ageing 168 hrs. in oxygen bomb | | |
| 60' at 45#  | 1255 | 2585 |
| 75' at 45#  | 1170 | 2335 |
| 90' at 45#  | 1065 | 2065 |

*Example 5*—30 parts of p,p'-diamino diphenyl methane are transformed into the hydrochloride either by adding concentrated hydrochloric acid to the amine and evaporating to dryness, or by dissolving or suspending p,p'-diamino diphenyl methane in a minimum amount of acetone and passing dry hydrochloric acid gas through the mixture. Acetone is then added to the hydrochloride and the mass is heated in an autoclave during 20 hours at approximately 140° C., in the presence of a small amount of iodine as a catalyst. The reaction mixture is then allowed to cool and the gas pressure is released by opening the valve of the autoclave. Excess acetone is then recovered by distillation and approximately 10% caustic soda solution is added in order to make the mass alkaline. The reaction product usually floats on top of the aqueous solution and is separated. Low-boiling material is removed by distillation under vacuum. The final product is a brown powder having excellent antioxidant properties. The material was tested in the usual way. The results of the test were as follows:

| Tensiles before ageing | Blank | +reaction product |
|---|---|---|
| 60' at 45#  | 4195 | 4160 |
| 75' at 45#  | 4315 | 4125 |
| 90' at 45#  | 4160 | 4190 |
| Tensiles after ageing 168 hrs. in oxygen bomb | | |
| 60' at 54#  | 1245 | 2955 |
| 75' at 45#  | 1155 | 2755 |
| 90' at 45#  | 998 | 2640 |

*Example 6*—100 parts of diphenylamine hydrochloride and 300 parts of acetone are heated in an autoclave during 30 hrs. at 170–190° C. The oil obtained is filtered and neutralized with dilute aqueous sodium carbonate solution. 150 parts of the reaction product are obtained. 1½ parts of the reaction product are incorporated in the usual manner in a standard tire tread compound containing 100 parts of rubber, 50 parts carbon black and a mixture of 1 part of hexamethylene tetramine and .25 parts of diphenyl guanidine. A similar mix was made but omitting the reaction product. The mixes are vulcanized in a mold for 60 minutes and 75 minutes at 45 pounds steam pressure. Samples of the resulting stocks are aged for 168 hours in the oxygen bomb, and for 3 weeks in air at 158° F. Values are given below:

| | Tensiles before ageing | Tensiles after ageing | |
|---|---|---|---|
| | | Oxygen | Air |
| Blank 60'  | 4065 | 1095 | 1787 |
| 75'  | 4070 | 985 | 1563 |
| +reaction 60'  | 4005 | 2660 | 3350 |
| product 75'  | 3975 | 2790 | 3320 |

*Example 7*—Ortho toluidine hydrochloride and acetone are reacted in the same manner as in Example 6 to produce the reaction product. 1 part of the reaction product was used in the usual way in a standard tire tread compound containing 100 parts rubber, 42 parts carbon black .875 parts of dinitro phenyl dimethyl dithiocarbamate. A similar mix was made but omitting the reaction product. The mixes are vulcanized in a mold for 60 minutes at 25 pounds steam pressure. Samples of the resulting stocks are aged during 3 weeks in air at 158° F. Values are given below:

| | Tensiles before ageing | Tensiles after ageing |
|---|---|---|
| Blank  | 4650 | 1081 |
| +reaction product  | 5027 | 3893 |

The vulcanized stocks are tested to show their resistance to cracking under repeated stresses due to alternate stretching and bending. Values are given in kilocycles, one kilocycle indicating a complete cycle of stretching and bending repeated 1000 times. Definite cracking of the stock indicates the end point.

|  | Kilocycles |
|---|---|
| Blank | 88 |
| + reaction product | 120 |

*Example 8*—Rearranged reaction products of ketones and amino compounds. 105 parts of acetone-aniline reaction product, prepared by reacting under heat and pressure aniline and acetone in the presence of a dehydrating agent such as iodine as described in my copending application Serial No. 411,665, filed December 4, 1929 were mixed with 100 grams of aniline and 20 cc. of concentrated aqueous hydrochloric acid. The mixture was kept at a temperature of 90° C. during 30 hours. At the end of 30 hours the hydrochloric acid was neutralized with caustic soda and unreacted aniline was removed by vacuum distillation. The residue weighed 120 grams and became brittle on cooling. It can be ground to a light brown powder. The product was tested by incorporating 1.5 parts in a tire tread compound as in Example 6, and vulcanizing and ageing as described above. The tensile strengths before and after ageing are shown below.

| Green tensiles | Blank | +reaction product |
|---|---|---|
| (Cure) 60′ at 45# | 4260 | 4230 |
| (Cure) 75′ at 45# | 4415 | 4265 |
| (Cure) 90′ at 45# | 4215 | 4275 |
| Aged 168 hrs. in oxygen | | |
| (Cure) 60′ at 45# | 1310 | 3440 |
| (Cure) 75′ at 45# | 1250 | 3250 |
| (Cure) 90′ at 45# | 1180 | 3115 |

The accelerating properties of the reaction product is shown by incorporating 1.5 parts of the reaction product in a tire tread compound similar to that above but from which the usual accelerator was omitted.

|  | Cure | Tensiles |
|---|---|---|
| Blank | 90′ at 45# | 1830 |
| + reaction product | 90′ at 45# | 3595 |

The accelerating properties are also shown by incorporating 1 part of the reaction product in a rubber mix consisting of 100 parts of rubber, 10 parts of zinc oxide, and 3 parts of sulphur.

|  | Cure | Tensiles |
|---|---|---|
| Blank—no accelerator | 60′ at 40# | 402 |
| + reaction product | 60′ at 40# | 2245 |

The simplest acetone aniline reaction product, on rearranging in the presence of aniline hydrochloride, would yield a product of the probable formula

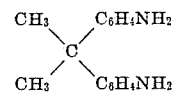

which can be called p,p′-diamino-di-phenyl-di-methyl methane. The reaction product of one mole of mesityl oxide and one mole of aniline on rearranging would yield a compound of the probable formula:

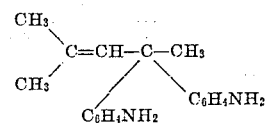

And finally, a phorone-aniline reaction product upon rearranging would yield a product of the probable formula

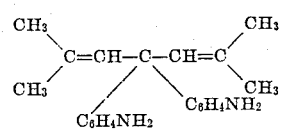

It is obvious that the above and similar products correspond to the probable general formula

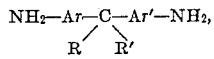

wherein $Ar$ and $Ar'$ are similar or dissimilar arylene groups, and $R$ and $R'$ are aliphatic hydrocarbon groups which may be saturated or unsaturated.

Rearranged ketone-amine reaction products may be made by rearranging in the presence of aromatic amine salts generally. For example instead of using aniline hydrochloride as in the example above, the hydrochloride of naphthylamine or of diphenyl guanidine may be used. Also when the amine used in the preparation of the ketone-amine is different from the rearranging amines, rearranged ketone-amines of a mixed character result. For example the reaction product of acetone and alpha- or beta-naphthylamine may be rearranged in the presence of aniline hydrochloride, and the reaction product of acetone and 4,4′-diamino-diphenyl amine may be rearranged in the presence of toluidine hydrochloride.

*Example 9*—Aldehyde derivative of a rearranged ketone-amine reaction product—82 grams of acetone-aniline reaction product, which had been rearranged in the presence of aniline-hydrochloride, are melted in 100 cc. of water, and 1 drop of concentrated hydrochloric acid and 10 grams of 37% aqueous formaldehyde are added. The mixture is held at a temperature of 60° C. during 30 minutes; the mixture is then cooled. The resin thus obtained is separated from the water and dried. By this treatment with formaldehyde the rearranged acetone aniline, which is a rather sticky resin, is changed into a hard resin which may be easily powdered.

An example of the use of this chemical in rubber is as follows: 1.5 parts were incorporated as described above in a standard tire tread stock. The mix was vulcanized and aged under the conditions described above. A blank containing no antioxidant was vulcanized and aged under the same conditions. The tensile tests before and after ageing are as follows:

| Green tensiles | Blank | +reaction product |
|---|---|---|
| 60' at 45# | 4180 | 4240 |
| 75' at 45# | 4340 | 4400 |
| 90' at 45# | 4225 | 4305 |
| Aged 168 hrs. in oxygen | | |
| 60' at 45# | 1620 | 3160 |
| 75' at 45# | 1475 | 3120 |
| 90' at 45# | 2040 | 2840 |
| Aged 3 weeks at 158° F. | | |
| 60' at 45# | 1545 | 2815 |
| 75' at 45# | 1145 | 2415 |
| 90' at 45# | 1570 | 2480 |

*Example 10*—Aldehyde derivatives of a reaction product of a ketone and an amine salt—To ten parts of reaction product of acetone and diphenyl guanidine hydrochloride are added 20 parts of 37% aqueous formaldehyde solution. The temperature rises from 20° C. to approximately 37° C., and a red viscous oil separates. The reaction is allowed to proceed at room temperature during 16 hours or longer. The reaction product is then taken up in ether and the ether removed by distillation. The residue can be used without further purification. Yield 11½ parts. This material was tested in a rubber mix as described above, with the following results:

| Tensile before ageing | Blank | + derivative |
|---|---|---|
| 60' at 45# | 4445 | 4335 |
| 75' at 45# | 4285 | 4095 |
| 90' at 45# | 4515 | 4160 |
| After ageing 168 hrs. in oxygen bomb | | |
| 60' at 45# | 1285 | 2760 |
| 75' at 45# | 1250 | 2635 |
| 90' at 45# | 1605 | 2550 |

Instead of formaldehyde, acetaldehyde, aldol, butylaldehyde, crotonaldehyde, heptaldehyde, etc. may be used in Examples 9 and 10 to produce the corresponding derivatives.

It is to be understood that a mixture of the reaction products or derivatives may be used in rubber instead of a single reaction product or derivative. Also that a mixture of ketones, or a single ketone may be reacted with a single amino compound or with a mixture of amino compounds or salts thereof, such as described herein, to give products that may be used in rubber in the same manner.

The chemicals disclosed may be used to improve the properties as mentioned herein of inner tubes, tires, thread, hose, dipped goods, mechanical goods, latex or articles made from latex etc.

"Salt of an aromatic amino compound" and "amine salt" in the claims are to be understood as meaning the acid addition product of the amines or amino compounds, such as the hydrochloride, the sulfate, the phosphate, the acetate, etc. Also the term "rubber" is to be construed as including natural rubber, gutta percha, balata, synthetic rubber, or other rubber-like materials.

This case is a division of application Serial No. 411,666, filed December 4, 1929.

With the detailed description given above, it will be obvious that modifications will suggest themselves without departing from the principle of the invention, for example in the preparation of any of the hereinmentioned compounds, the corresponding thioketone or the corresponding ketone dihalide may be used in place of a ketone, and it is not desired to limit the invention otherwise than as set forth in the appended claims.

Having thus described my invention, what I claim and desire to protect by Letters Patent is:

1. A method of treating rubber which comprises treating rubber with an aldehyde derivative of a compound having the probable formula

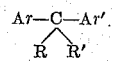

wherein $Ar$ and $Ar'$ are each aromatic groups comprising amino nitrogen, and R and R' are hydrocarbon groups which may be saturated or unsaturated.

2. A method of treating rubber which comprises treating rubber with an aldehyde derivative of a compound having the probable formula

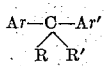

wherein $Ar$ and $Ar'$ are each aromatic groups comprising amino nitrogen, and R and R' are aliphatic hydrocarbon groups which may be saturated or unsaturated.

3. A method of treating rubber which comprises treating rubber with an aldehyde derivative of the reaction product of a ketone and a salt of an aromatic amine.

4. A method of treating rubber which comprises treating rubber with a formaldehyde derivative of the reaction product of a ketone and an aromatic amine salt.

5. A method of treating rubber which comprises treating rubber with a formaldehyde derivative of the reaction product of an aliphatic ketone and an aromatic amine salt.

6. A method of treating rubber which comprises treating rubber with a formaldehyde derivative of the reaction product of acetone and a primary aromatic amine salt.

7. A method of treating rubber which comprises treating rubber with a formaldehyde derivative of the reaction product of acetone and aniline hydrochloride.

8. A method of improving the properties of rubber which comprises vulcanizing rubber in the presence of an aldehyde derivative of the reaction product of a ketone and a salt of an aromatic amino compound.

9. A method of improving the properties of rubber which comprises vulcanizing rubber in the presence of a formaldehyde derivative of the reaction product of a ketone and an aromatic amine salt.

10. A method of improving the properties of rubber which comprises vulcanizing rubber in the presence of a formaldehyde derivative of the reaction product of an aliphatic ketone and an aromatic amine salt.

11. A method of improving the properties of rubber which comprises vulcanizing rubber in the presence of a formaldehyde derivative of the reaction product of acetone and a primary aromatic amine salt.

12. A method of improving the properties of rubber which comprises vulcanizing rubber in the presence of a formaldehyde derivative of the reaction product of acetone and aniline hydrochloride.

13. A method of improving the properties of rubber which comprises vulcanizing rubber in the presence of a formaldehyde derivative of the reaction product of acetone and diphenyl guanidine hydrochloride.

14. A method of treating rubber which comprises treating rubber with an aldehyde derivative of a compound having the probable formula $$H_2N-Ar-C-Ar'-NH_2$$
$$\diagdown R \quad R' \diagup$$

wherein $Ar$ and $Ar'$ are each similar or dissimilar arylene groups, and $R$ and $R'$ are each aliphatic hydrocarbon groups which may be saturated or unsaturated.

15. A method of treating rubber which comprises treating rubber with an aldehyde derivative of a rearranged ketone-aromatic amino compound reaction product.

16. A method of treating rubber which comprises treating rubber with an aliphatic aldehyde derivative of a rearranged aliphatic ketone-aromatic amine reaction product.

17. A method of treating rubber which comprises treating rubber with an aldehyde derivative of a rearranged aliphatic ketone-aromatic amine reaction product.

18. A method of treating rubber which comprises treating rubber with a formaldehyde derivative of a rearranged ketone-primary aromatic amine reaction product.

19. A method of treating rubber which comprises treating rubber with a formaldehyde derivative of a rearranged acetone-primary aromatic amine reaction product.

20. A method of treating rubber which comprises treating rubber with a formaldehyde derivative of rearranged acetone-aniline reaction product.

21. A method of improving the properties of rubber which comprises vulcanizing rubber in the presence of an aldehyde derivative of a rearranged ketone-aromatic amino compound reaction product.

22. A method of improving the properties of rubber which comprises vulcanizing rubber in the presence of an aldehyde derivative of a rearranged aliphatic ketone-aromatic amine reaction product.

23. A method of improving the properties of rubber which comprises vulcanizing rubber in the presence of a formaldehyde derivative of a rearranged ketone-aromatic amine reaction product.

24. A method of improving the properties of rubber which comprises vulcanizing rubber in the presence of a formaldehyde derivative of a rearranged acetone-primary aromatic amine reaction product.

25. A method of improving the properties of rubber which comprises vulcanizing rubber in the presence of a formaldehyde derivative of rearranged acetone-aniline reaction product.

26. A rubber product which has been treated with an aldehyde derivative of a rearranged ketone-aromatic amino compound reaction product.

27. A rubber product which has been treated with an aldehyde derivative of a rearranged aliphatic ketone-aromatic amine reaction product.

28. A rubber product which has been treated with a formaldehyde derivative of a rearranged ketone-aromatic amine reaction product.

29. A rubber product which has been treated with a formaldehyde derivative of a rearranged acetone-primary aromatic amine reaction product.

30. A rubber product which has been treated with a formaldehyde derivative of a rearranged acetone-aniline reaction product.

31. A vulcanized rubber product containing rubber which has been vulcanized in the presence of an aldehyde derivative of a rearranged ketone-aromatic amino compound reaction product.

32. A vulcanized rubber product containing rubber which has been vulcanized in the presence of an aldehyde derivative of a rearranged aliphatic ketone-aromatic amine reaction product.

33. A vulcanized rubber product containing rubber which has been vulcanized in the presence of a formaldehyde derivative of a rearranged ketone-aromatic amine reaction product.

34. A vulcanized rubber product containing rubber which has been vulcanized in the presence of a formaldehyde derivative of a rearranged acetone-primary aromatic amine reaction product.

35. A vulcanized rubber product containing rubber which has been vulcanized in the presence of a formaldehyde derivative of a rearranged acetone-aniline reaction product.

Signed at Montclair, county of Essex, State of New Jersey, this 24th day of July 1931.

WILLIAM P. ter HORST.